Figure 1:
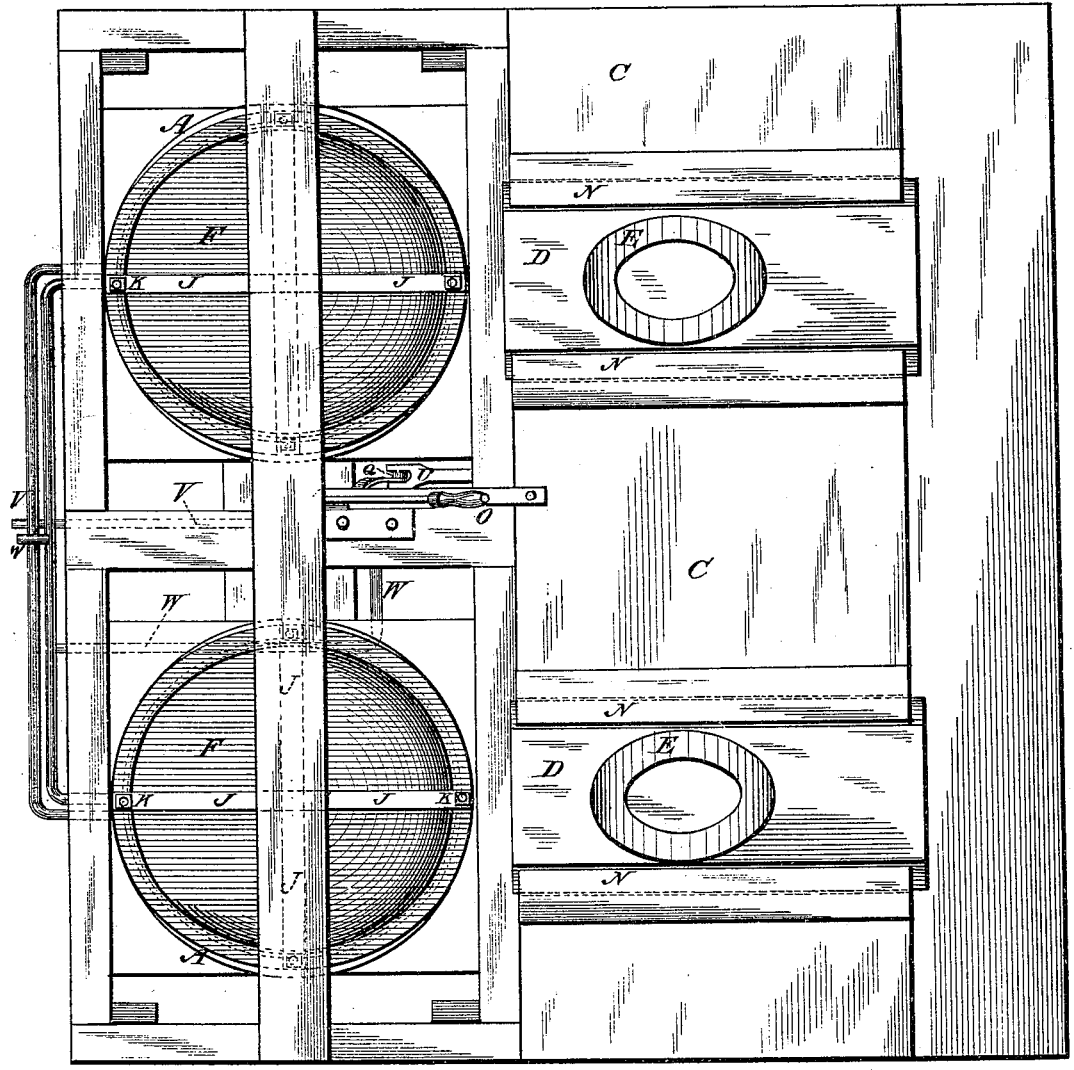

(No Model.) 3 Sheets—Sheet 1.

A. P. QUINBY.
Machine for Flanging and Curling Hats.

No. 231,098. Patented Aug. 10, 1880.

Witnesses:
Fred. G. Dieterich
D. C. Dieterich

Inventor:
Aaron P. Quinby
per Charles H. Nash
Attorney (No Model.) 3 Sheets—Sheet 2.
A. P. QUINBY.
Machine for Flanging and Curling Hats.
No. 231,098. Patented Aug. 10, 1880.
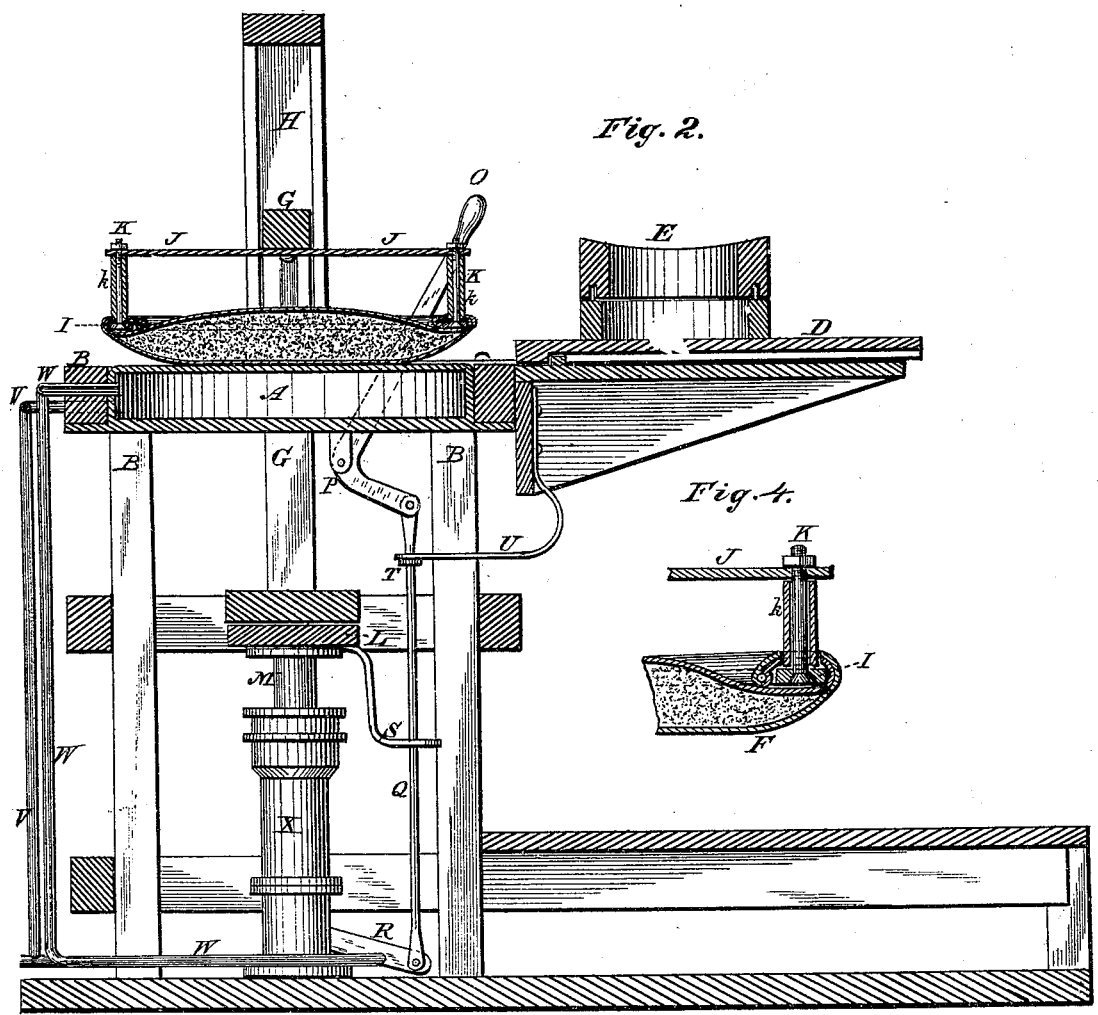
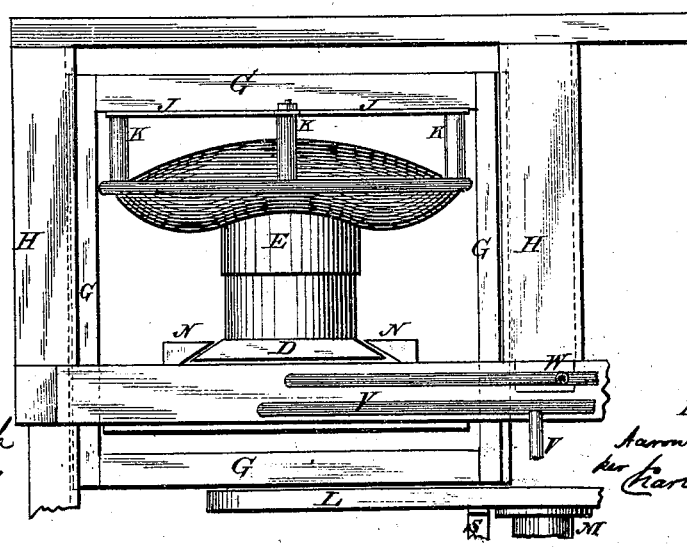
Witnesses:
Fred. G. Dieterich
P. C. Dieterich
Inventor:
Aaron P. Quinby
per Charles H. Nash
attorney (No Model.)  3 Sheets—Sheet 3.
A. P. QUINBY.
Machine for Flanging and Curling Hats.
No. 231,098.  Patented Aug. 10, 1880.
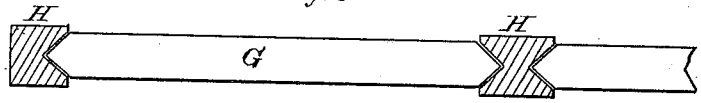
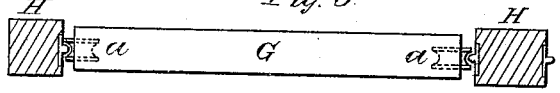
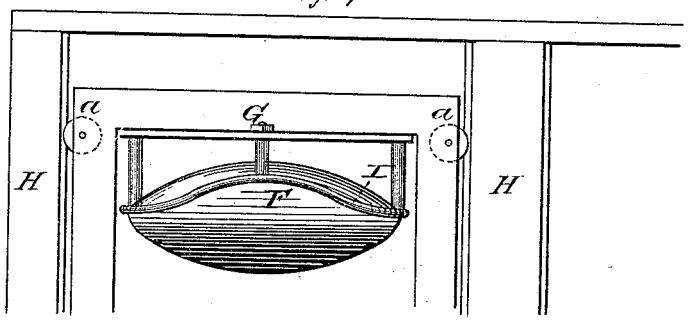
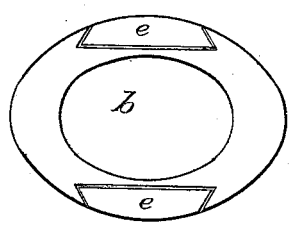
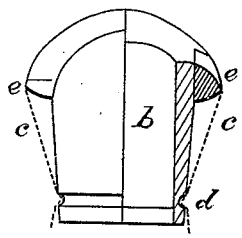
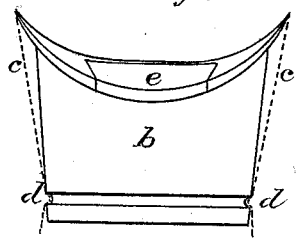
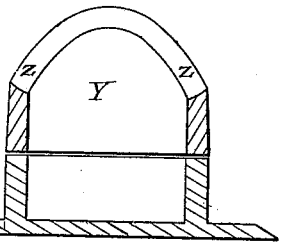
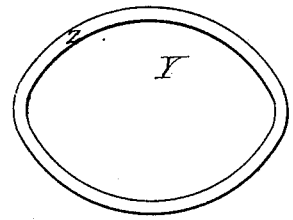
Witnesses:
Fred G. Dieterich
P. C. Dieterich
Inventor
Aaron P. Quinby
per Charles H. Nash
Attorney
N. PETERS, PHOTO-LITHOGRAPHER, WASHINGTON, D. C.

UNITED STATES PATENT OFFICE.

AARON P. QUINBY, OF EAST ORANGE, NEW JERSEY.

MACHINE FOR FLANGING AND CURLING HATS.

SPECIFICATION forming part of Letters Patent No. 231,098, dated August 10, 1880.

Application filed April 27, 1880. (No model.)

*To all whom it may concern:*

Be it known that I, AARON P. QUINBY, a citizen of the United States, residing at East Orange, in the county of Essex and State of New Jersey, have invented certain new and useful Improvements in Machines for Flanging and Curling Hats, of which the following is a specification.

Heretofore it has been customary in flanging and curling hats to use hot sand-bags of about eighty pounds weight, and the labor of lifting these bags by hand to and from the heater to the flanges has been very laborious, and requires great strength and considerable practice to enable the operator to plant the bag fairly on the flange so as to prevent the shifting of the brim and consequent production of marks and slack places; and the curling of stiff hats has heretofore only been successfully accomplished by hand-work and is considered a work of art in the trade.

An attempt has been made to overcome the difficulties connected with this mode of manufacture by suspending the sand-bags over the heater by a cord and pulley operated by hand.

Machines have also been invented in which the power of the foot is brought into play to move the sand-bag in a curvilinear direction from the heater to the hat and back again. Neither of these, however, were constructed to be moved by power, nor are the sand-bags set in a frame which moves vertically over the hat.

The object of my invention is to construct a device which will enable both soft and stiff hats to be flanged and curled with greater ease than heretofore, and at the same time lessen the cost of the work, as well as to produce a better and more uniformly flanged and curled hat without the aid of skilled labor.

My invention consists, mainly, in attaching the sand-bags to a frame which slides in guides in such a manner that the sand-bags move in a vertical line and always descend in exactly the same vertical position, in contradistinction to the curvilinear movement before referred to, or to the loosely-swinging vertical movement due to the cord-and-pulley arrangement heretofore mentioned; and it further consists in certain details of construction and arrangement of parts whereby the main feature of my invention is carried out, which will be hereinafter more fully described and then pointed out in the claims.

Figure 1 represents a plan. Fig. 2 is a sectional side view, showing the sand-bag at rest on the heater. Fig. 3 is a rear view, showing one of the sand-bags in the act of flanging. Fig. 4 is a detail view, showing the connection of the sand-bag to the supporting-ring. Fig. 5 is a plan, showing a modification of the sliding frame. Figs. 6 and 7 are modifications of the same. Fig. 8 is a semi-sectional end view of a flange for curling a stiff hat. Fig. 9 is a side view of the same. Fig. 10 is a plan of the same. Fig. 11 is a cross-section of the metallic ring for setting the curl. Fig. 12 is a plan of the same.

Similar letters of reference indicate corresponding parts.

In the case here presented A A are two steam-heaters rigidly attached to the main frame B, with their upper surfaces on the same plane with that of the table C, so that the slides D D, upon which the flanges E are set, may be pushed inward under the sand-bags F F and have a solid bearing thereon.

The frames G G are guided and held vertically in position by the uprights H H H, and, so as to have as little friction as possible, they are preferably made to run on a V-slide, as shown at G in Fig. 5, or its equivalent, as shown in Figs. 6 and 7, which consists of grooved or friction wheels $a\ a$, set in the frames G, so as to run on rails set in the uprights H.

The sand-bags F F have a feather around their edge, which being a double thickness of cloth and no sand between, a strong and durable means is provided thereby for connecting the same to the metal rings I I, the connection being made by running a cord through and around the feather and then drawing the cord tight and tying over the rings. The said rings I I are preferably made slightly oval, raised a little at the front and back, and depressed a little at the sides, as shown in Fig. 7, so as to assist the sand-bag to conform to the dished-shape of the flanges. The said rings are rigidly suspended from the extremities of arms J J J J by bolts K, which pass through tubes $k$, so as to give sufficient height for the play of the sand-bags as well as to place the weight of the frame G on the exterior, so as to cause the sand-bags to hug the curl of the flanges to the best advantage.

The above-described metal frames for holding the sand-bags are rigidly attached to the under side of the top bar of the vertical sliding frames G G. The frames G G both rest upon a stiff cross-piece, L, which is centrally supported on top of the piston-rod M, so that any movement of the piston will actuate both frames simultaneously.

The slides D D for the flanges are set in ways N N on the table C, so that they may be moved rapidly in true position under the sand-bags.

O is a hand-lever pivoted at P. To the lower extremity of this lever the rod Q is attached, and extends downward therefrom to the rock-arm R of the valve at the base of the cylinder X.

S is an arm rigidly attached to the supporting cross-piece L. This arm extends outward therefrom, and has its end slotted to allow the valve-rod Q, which passes through, freedom of action, so that as the frames G are raised by the piston to a given height, regulated by the nut T, the said arm S, coming in contact with this nut, causes the rod Q to lift, and thereby opens the exhaust-port. The object of this is to prevent the piston from driving the frames up too hard beyond a given point. U is a counter-spring bearing on top of the aforesaid nut.

V V are the feed-pipes conveying steam to the cylinders and also to the heaters, and W represents the exhaust from the same.

In flanging soft hats by the methods now in use it is a very common occurrence to have what are termed "marks" and "slack spaces." These are produced either by the shifting of the brim on the flange or from not planting the sand-bag fairly upon the flange. Now, in using my device the flange is always run in to a fixed position and the sand-bags brought down direct and true; consequently this difficulty is overcome, but another and more serious difficulty presents itself in the curling of both soft and stiff hats where the curl is made tight, so that the sand-bag cannot perform the work; and to overcome this difficulty I have devised and use a metal ring, Y, of sufficient size to receive a hat-flange, and have the top of the said ring dished and inclined on its face, as shown at Z, to conform to the top curl it may be desired to give to the brim.

The hat desired to be curled is placed in the flange b, and a piece of cloth, as represented by dotted lines c, is stretched over the same and tied to the flange at the groove d by a cord. This leaves a space between the curl of the flange and the cloth. Now, the metal ring having been heated, it is placed on the slide-stand D, and the hat, as above prepared in the flange, is placed therein, so that when the weight of the sand-bags is brought down upon the same the curl will be made perfectly by the drawing in of the cloth in connection with the heated ring, which also acts as a pressing-iron against the curl; and in cases where a stiff hat is to be curled I have the curled section of each side of the flange cut out on the quarters, as shown at e, Figs. 8, 9, and 10, so that on removing the hat from the flange after the curl is set both these curled sections of the flange will follow out with the hat. The said sections can now be removed from the hat by pushing them toward the front or rear of the hat, and thus leave the curl well and properly set.

It is evident that by the construction and arrangement of parts herein set forth a direct downward movement will be given to the sand-bag, which will always plant said sand-bag firmly and evenly upon the center of the hat, and that the natural sag of the bag will cause the first pressure to be on the inner edge of the hat brim, and that the bag gradually spreads itself evenly as it lowers until it reaches and covers the outer edge. Thus, by its natural motion in spreading, it has a tendency to draw outward from the first point of contact, and thereby prevents the marks and slack places so common in the use of sand-bags as heretofore used.

In addition to these advantages, the weight of the frames and piston, added to the sand-bag, enables the brims of the hats to be pressed tighter and heated quicker, thus producing both better and quicker work.

Having thus described my invention, what I claim as new, and desire to secure by Letters Patent, is—

1. In a hat flanging and curling machine, the combination, with a sand-bag, F, of a frame, G, carrying said bag and traveling in perpendicular guides, and adapted to drop with the bag vertically upon the hat, whereby the sand-bag first engages the inner edge of the hat and holds it firm in the flange, and in sinking gradually spreads and forces the marks and slack places outward, thus obliterating them, substantially as herein set forth and described.

2. The combination, with the heater A, of the sand-bag F, formed upon a ring, I, dished to correspond with the shape of the hat, arranged to rise and fall vertically over said heater, whereby the heater forms the bed on which the flange rests to receive the pressure of the sand-bag, substantially as described.

3. The combination of a vertically-moving sand-bag, F, with a heater, A, arranged beneath it, and the table C, provided with guides for the flange, in the same horizontal plane with the heater, substantially as and for the purpose specified.

4. The combination, with the piston M, of the cross-bar L and independent bag-carrying frames G G, substantially as shown and described.

5. The combination of the frame G, cross-bar J, tubes k, ring I, bolts K, and sand-bag F, substantially as and for the purpose specified.

6. The combination of the vertically-moving frames G, cylinder X, piston M, arm S, nut T, spring U, rod Q, and valve-lever R, substantially as and for the purpose specified.

7. The flange b, provided with the detachable curl-sections e e, whereby the hat may be removed from the flange after it is curled by the pressure of the sand-bag, substantially as specified.

8. The combination, with the flange b, of the metal ring Y, provided with the beveled face Z, acting as a ring to draw in the cloth c, and a heater to set the top of the curl of the hat-brim under the pressure of the sand-bag, substantially as described.

9. The combination of the heater A, main frame B, having guides H, movable frames G, carrying the sand-bags F, table C, slide D, guides N, and flange E, substantially as shown and described.

10. The combination of the heater A, main frame B, movable frame G, piston M, cylinder X, valve-lever R, rod Q, arm S, nut T, spring U, and lever O, the same being constructed, arranged, and operating in the manner and for the use and purpose specified.

11. The combination, with the flange b, and canvas c, of the ring Y, substantially as described and for the purpose set forth.

AARON P. QUINBY.

Witnesses:
ELIZABETH G. NASH,
CHARLES H. NASH.